United States Patent [19]

Eger et al.

[11] Patent Number: 5,141,281
[45] Date of Patent: Aug. 25, 1992

[54] REAR-END SPOILER ARRANGEMENT FOR A PASSENGER MOTOR VEHICLE

[75] Inventors: George Eger, Hochdorf/Vaihingen; Reiner Weidemann, Ehingen, both of Fed. Rep. of Germany

[73] Assignee: Dr. Ing. h.c.F. Porsche, Fed. Rep. of Germany

[21] Appl. No.: 691,418

[22] Filed: Apr. 25, 1991

[30] Foreign Application Priority Data

May 4, 1990 [DE] Fed. Rep. of Germany ....... 4014380

[51] Int. Cl.⁵ ............................................. B62D 35/00
[52] U.S. Cl. .................................................. 296/180.5
[58] Field of Search ............... 296/180.5, 180.1, 180.2, 296/180.3, 91, 217

[56] References Cited

U.S. PATENT DOCUMENTS

| 2,710,772 | 6/1955 | Schulein | 296/91 |
| 4,889,382 | 12/1989 | Burst et al. | 296/180.5 |
| 4,986,598 | 1/1991 | Yamauchi et al. | 296/217 |

FOREIGN PATENT DOCUMENTS

| 226778 | 7/1987 | European Pat. Off. | 296/180.1 |
| 0298205 | 11/1989 | European Pat. Off. | |
| 2517746 | 4/1976 | Fed. Rep. of Germany | 296/91 |
| 3615584 | 12/1987 | Fed. Rep. of Germany | |
| 3735185 | 3/1989 | Fed. Rep. of Germany | |
| 63-207777 | 8/1988 | Japan | 296/180.1 |
| 2-117476 | 5/1990 | Japan | 296/180.3 |
| 2-120195 | 5/1990 | Japan | 296/180.5 |

Primary Examiner—Margaret A. Focarino
Assistant Examiner—Joseph D. Pape
Attorney, Agent, or Firm—Evenson, Wands, Edwards, Lenahan & McKeown

[57] ABSTRACT

A passenger motor vehicle has a spoiler arrangement in the rear area which is formed by a flap integrated into the vehicle body. The flap is movable by an adjusting device from an inoperative position extending approximately flush with the vehicle body shell into a moved-out, operative position, and vice versa. When the spoiled arrangement is in its moved-in, inoperative position, a continuous smooth-surface transition is thereby achieved between the flap and the adjacent body. In the moved-out, operative position, a defined breaking away of the air current passing the fast back is ensured. The spoiler arrangement also has an air current breakaway element which is constructed separately from the flap. The element extends in the transverse direction of the vehicle, in the operative position of the spoiler arrangement, the element extends adjacent to a rear edge of the flap. An upper edge area of the current breakaway element, viewed in a vertical direction, projects by a certain distance beyond an exterior leading surface of the flap.

10 Claims, 4 Drawing Sheets

REAR-END SPOILER ARRANGEMENT FOR A PASSENGER MOTOR VEHICLE

BACKGROUND AND SUMMARY OF THE INVENTION

The present invention relates to a motor vehicle, particularly a fast back passenger car, having a spoiler arrangement arranged in the rear area, movable between a moved-in position and a moved-out position.

A known spoiler arrangement as shown in German Patent DE-OS 36 15 584 functions well. This spoiler arrangement is provided on the fast back of a passenger car which is formed by a flap that can be tilted out and which can be moved, by way of an adjusting device, from a retracted inoperative position into an extended operative position. Viewed in a longitudinal section, the flap has a convex shape. When the flap is into the moved-out position, a defined breakaway of the air current is achieved on the spoiler arrangement because of the convex shape flap shape. An upwardly projecting molded-on part, is provided on the flap in the rear end area. This has the result that a step-shaped transition exists locally between the rear edge area of the flap and the adjacent outer surface of the lid when the spoiler arrangement is in its moved-in position.

It is an object of the present invention to provide a spoiler arrangement arranged on a fast back of a passenger car which is formed by a flap that, on one hand, achieves a continuous, smooth-surface transition between the flap and the adjacent body in a moved-in position of the spoiler arrangement and that, on the other hand, a defined breakaway of the air current passing the fast back is ensured when the spoiler arrangement is in the moved-out position.

According to the present invention, this object has been achieved by a spoiler arrangement which comprises a current breakaway element constructed separately from the flap and extending in the transverse direction of the vehicle. In the operative position of the spoiler arrangement, the element extends adjacent to a rear edge of the flap, with an upper edge area of the current breakaway element, viewed in the vertical direction, projecting by a measurement beyond an exterior leading surface of the flap.

Among the principal advantages achieved by the present invention are that, by means of the development of a separately arranged current breakaway element, a smooth continuous transition flush with the shell is achieved between the flap and the adjacent body when the spoiler arrangement is in its moved-in inoperative position. In addition, when the spoiler arrangement is in its moved-out position, a defined breakaway of the air current is achieved so that the air current is guided over the fast back area to increase the negative lift. Although the aerodynamic drag remains almost the same, a reduced lift or increased negative lift, is achieved on the rear axle (ratio: CW/CA).

The positive control of the current breakaway element ensures an automatic moving-out and moving-in of the current breakaway element as a function of the movement of the flap. In the moved-in inoperative position of the spoiler arrangement, the current breakaway element is arranged sunk in a receiving device of the lid and is thus not visible from the outside. The spoiler arrangement, the adjusting device and the positive control system have a simple construction and require little installation space.

BRIEF DESCRIPTION OF THE DRAWINGS

These and other objects, features and advantages of the present invention will become more apparent from the following detailed description of presently preferred embodiments when taken in conjunction with the accompanying drawings, wherein.

DETAILED DESCRIPTION OF THE DRAWINGS

Figure 1:
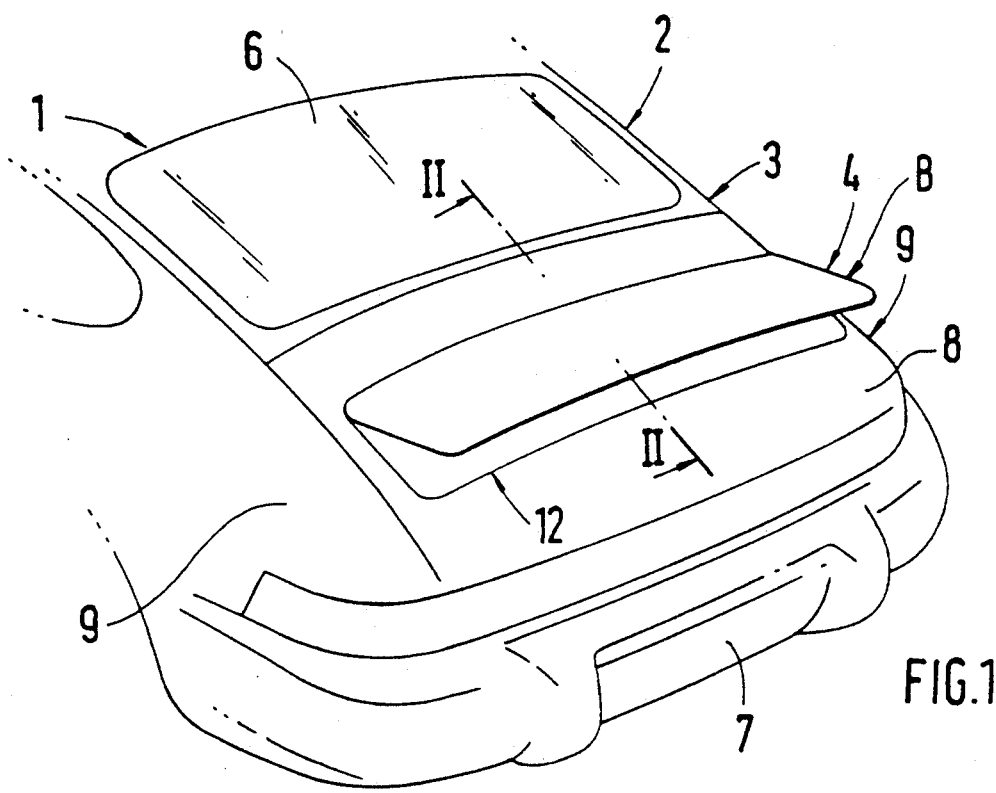
FIG. 1 is a perspective rear view of a rear area of a passenger car having a spoiler arrangement.

The passenger car 1 comprises a body 2 with a spoiler arrangement designated generally by numeral 4 which is arranged in the rear area 3 of the car 1 and which can be moved by an adjusting device 5 (FIG. 2) from an inoperative or moved-in position A (solid lines) extending flush with the adjacent body 2 into a moved-out or operative position B (dot-dash lines), and vice versa. By virtue of the spoiler arrangement 4, the drag coefficient of the passenger car is, on the one hand, reduced and, on the other hand, the dynamic rear wheel pressure is increased in the driving operation, i.e. negative lift. In the rear area 3, the body 2 comprises a rear window 6, a bumper 7 and a rear hood 8 which are arranged between side parts 9. The rear hood 8, which is composed of an exterior part 10 and an interior part 11, has an approximately rectangular opening 12 into which the spoiler arrangement 4 is selectively movable. The spoiler arrangement 4 is formed by a pivotable flap 13 which, on the side facing the rear window 6, by means of at least one hinge 14, is pivotally connected to the interior part 11 of the rear hood 8. The interior part 11 forms a trough-shaped receiving device 15 for the spoiler arrangement 4.

A hinge arm 16 of the hinge 14 is screwed to the interior part 11 of the rear hood 8, while the other hinge arm is fastened to the flap 13. The approximately horizontally aligned hinge pin 18 extends in the transverse direction of the vehicle. The flap 13 is made of sheet metal or plastic. In the moved-in inoperative position A, the flap 13 is aligned flush with the shell with respect to the adjacent body 2. On a circumferential side of the opening 12, a narrow joint extends between the flap 13 and the opening 12.

Viewed in a longitudinal section, the flap 13 inserted into the fast back has a convex shape, i.e. an exterior leading surface 20 of the flap 13 is arched toward the outside. In the moved-out, operative position B, the flap 13 is swivelled out of the body level such that its outer leading surface 20 is tilted upward by an angle a (FIG. 3) with respect to a horizontal auxiliary plane 21. The moved-out, operative position B is shown by dash-dotted lines in FIG. 3, whereas the moved-in, inoperative position A is indicated by solid lines.

Figure 2:
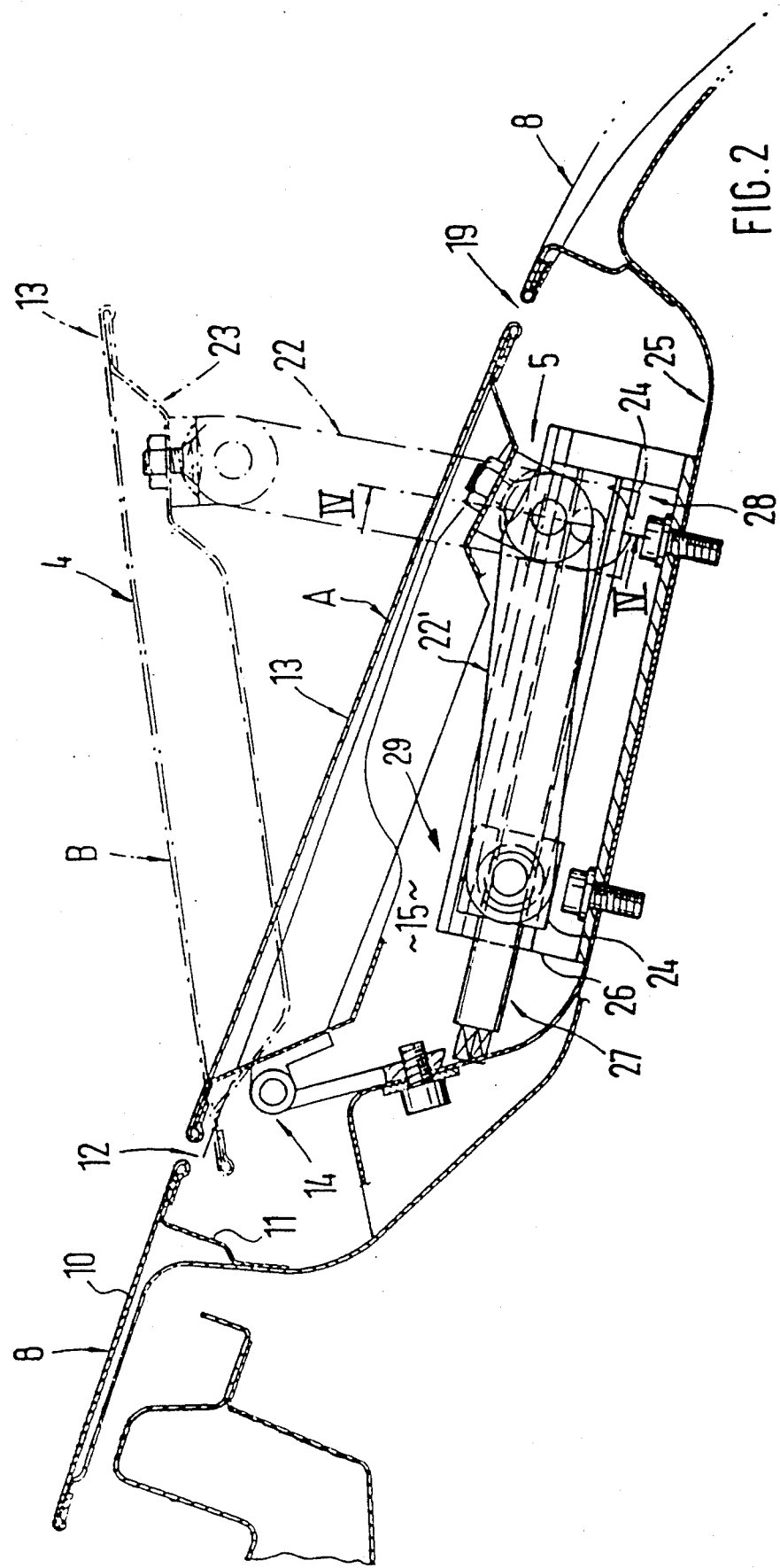
FIG. 2 is an enlarged sectional view along line II—II of FIG. 1, with only the spoiler arrangement and the adjusting device being shown.

According to FIG. 2, the adjusting device 5 for the spoiler arrangement 4 comprises a tilt-out lever 22 which, on one side, is hinged to a rear end area 23 of the flap 13 and, on the other side, is hinged to a guiding element 24. The guiding element 24 is displaceably disposed in a longitudinally directed guide rail 26, which is fastened to the floor 25 of the receiving device 15 or to the interior part 11 of the rear hood 8. The guide element 24 is driven by a spindle 27.

The spindle 27 is guided approximately in the center through the guiding element 24 and is aligned approximately parallel to the guide rail 26. By rotating movement of the spindle 27, the guiding element 24 is displaced in the guide rail 26. When the flap is tilted out (operative position B), the guiding element 24 is situated in a rear end area 28 of the guide rail 26 and the tilt-out lever 22 is aligned upright (FIG. 2). On the spindle 27, a multisurface drive journal is arranged on the end side which is connected with a transmission and an electric motor, either directly or via a flexible shaft.

Figure 4:
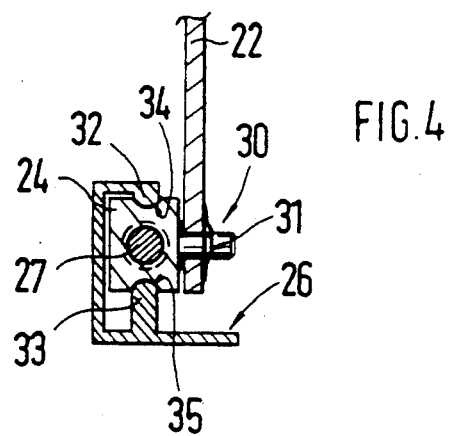
FIG. 4 is a sectional view along line IV—IV of FIG. 2.

When the flap 13 is in the moved-in, inoperative position A, the guiding element 24 is arranged adjacent to the forward end area 29 of the guide rail 26, and the tilt-out lever 22 extends approximately in parallel to the guide rail (position 22'). As seen in FIG. 4, a lower end area of the tilt-out lever 22 is fitted onto a bent-away journal section 30 of the guiding element 24 and is secured against an axial displacement by a securing element 31. The guide rail 26, has an approximately C-shaped profile and has locally molded-on webs 32, 33 with end-side circular-arc-shaped sections which engage in corresponding recesses 34, 35 of the guiding element 24.

Figure 3:
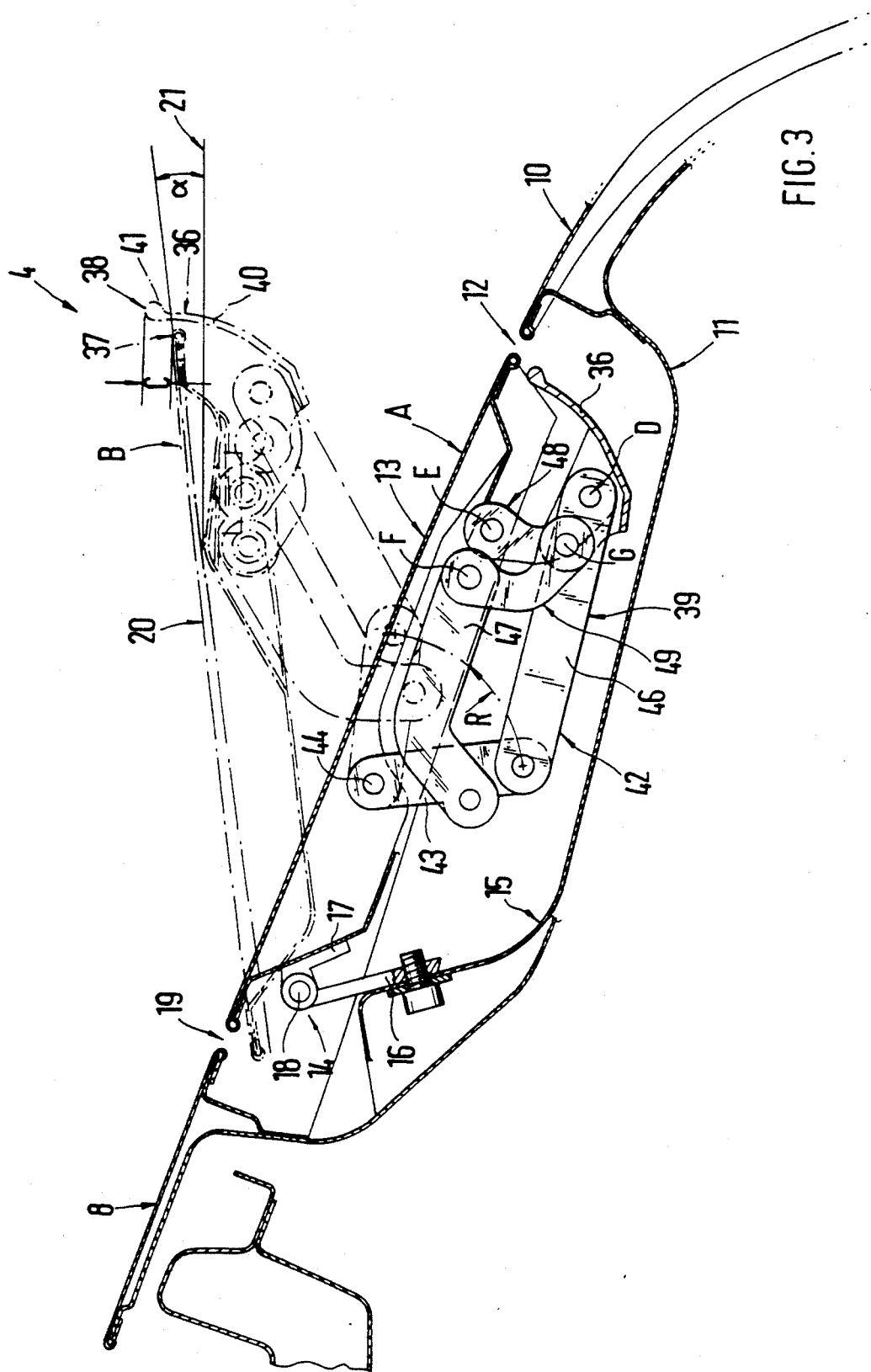
FIG. 3 is a sectional view similar to FIG. 2 in which the spoiler arrangement, the current breakaway element according to the invention and the actuating device for the current breakaway element are shown.

The spoiler arrangement 4 also includes a current breakaway element 36 which is separate from the flap 13, extends transversely of the vehicle. When the spoiler arrangement is in its moved-out operative position B, the element 36 extends adjacent to a rear edge 37 of the flap 13, as seen in FIG. 3. An upper edge area 38 of the current breakaway element 36, viewed in the vertical direction, projects beyond the exterior leading surface 20 of the flap 13 by a distance C. The distance C should amount to at least 10 mm in order to ensure a good functioning of the spoiler arrangement 4, i.e. in order to achieve an effective increase of the negative lift at the rear axle.

The current breakaway element 36 is connected with the flap 13 by a positive control system 39. That is, during the tilting-out of the flap 13, the current breakaway element 36 moves automatically into its moved-out, operative position B. In the moved-in, inoperative position A of the flap, the current breakaway element 36 is arranged to be sunk in the receiving device 15 of the rear hood 8. The current breakaway element 36 is formed by a transversely extending profile which, viewed in the flow direction, is concave and configured as a draft deflector. When the flap 13 is in the moved-out position, a top end area of the profile 40 is aligned approximately vertically. In addition, the profile 40 has a circular cross-sectional widened portion 41 on its upper end. By way of the current breakaway element 36, when the spoiler arrangement 4 is in the moved-out position, a defined breakaway edge is formed for the air current passing over the fast back to increase the negative lift. The rear area 3 may also be constructed as a notchback. When the spoiler arrangement is moved in (inoperative position A), however, the entire flap 13, including the edge area on the circumference side, is flush with the shell with respect to the adjacent body 2.

The positive control system 39 for the current breakaway element 36 is formed by a lever transmission 42. The lever transmission 42 comprises a first connecting rod 43 which is pivotally connected at 44 to the interior part 11 of the rear hood 8. The first connecting rod 43 moves around a circular arch with the radius R. A tilt-out lever 46 is rotatably connected with the air current breakaway element 36 at pivot D and leads away from the free end 45 of the first connecting rod 43.

A toggle lever 47 leads away from the first connecting rod 43 and, on one side, is rotatably connected with the first connecting rod 43 and, on the other side, is rotatably connected with the flap 13 at pivot F. In addition, the lever transmission 42 comprises two guiding levers 48, 49. The first guiding lever 48 is connected with the one end of the tilt-out lever 46 as well as with the current breakaway element 36, whereas the other end of the first guide lever 48 being pivotally connected to the flap (pivot E). The second guide lever 49, on one side, is pivotally connected with the flap 13 (pivot F) and, on the other side, is pivotally connected with the current breakaway element 36 (pivot G).

Figure 5:
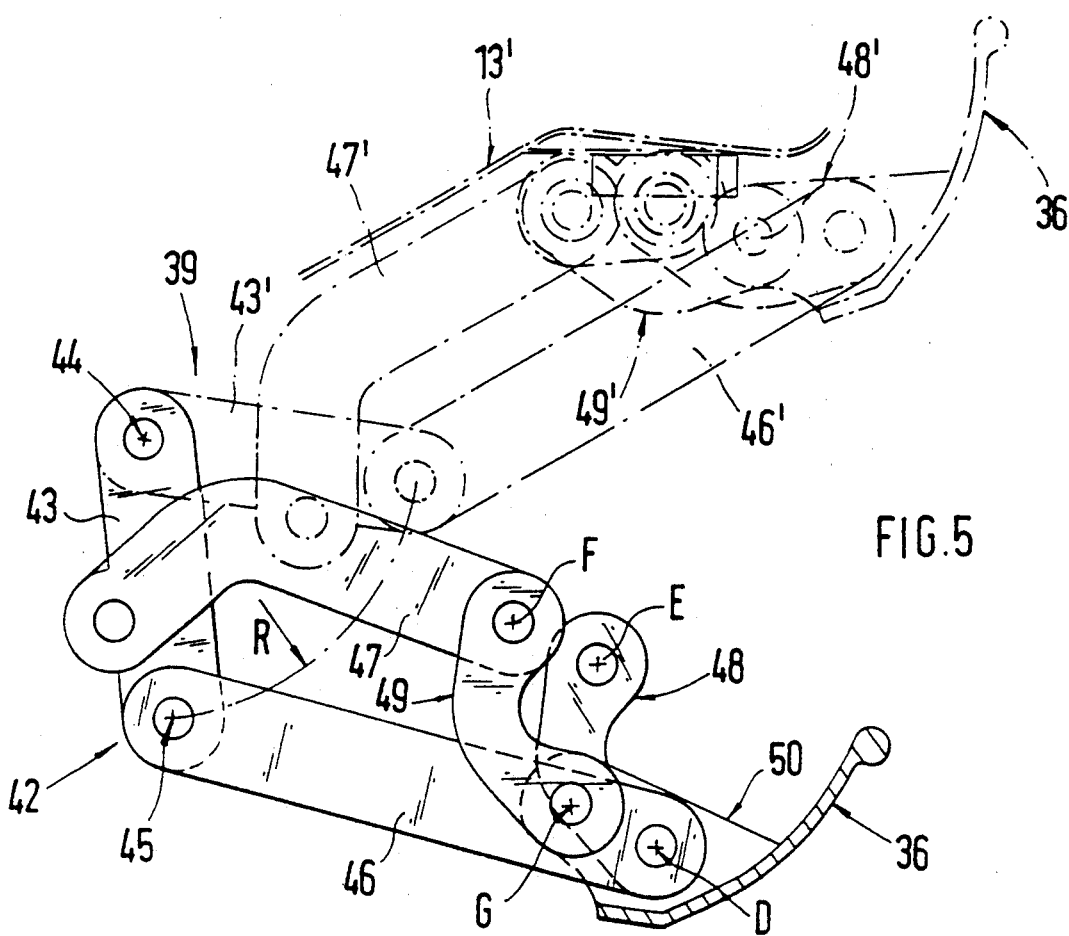
FIG. 5 is an enlarged view of the current breakaway element and of the positive control system of FIG. 3, in the moved-in (solid lines) and the moved-out position (dot-dash lines).

The flap-side end of the second guide lever 49 is also connected with the toggle lever 47. The pivots of the guide levers 48, 49 on the current breakaway element 36 and on the flap 13, when the flap 13 is in its moved-in, inoperative position A, extend in the manner of a parallelogram (pivot D, E, F, G) as seen in solid lines in FIG. 5. Pivots D, G of the guide levers 48, 49 on the current breakaway element 36 are arranged on a molded-on part 50 of the current breakaway element 36. In FIG. 5, the tilted-out, operative position B of the current breakaway element 36 is indicated by dash-dot lines; in this case, the connecting rod 43, the tilt-out lever 46, the toggle lever 47, and the guide levers 48, 49 take up positions 43', 46', 47', 48', and 49'.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle, having a spoiler arrangement arranged in a rear area of the vehicle, comprising a flap integrated in the vehicle body, an adjusting device for moving the flap from an inoperative position extending approximately flush with the body into a moved-out operative position and vice versa, and a current breakaway element separate from the flap, extending in a transverse direction of the vehicle, wherein, in the operative position of the spoiler arrangement, the element extends adjacent to a rear edge of the flap, with an upper edge area of the element, viewed in a vertical direction, projecting by a distance beyond an exterior leading surface of the flap, wherein the current breakaway element is operatively connected by a positive control system with the flap such that, during tilting-out of the flap, the current breakaway element is automatically moved into the moved-out, operative position.

2. The motor vehicle according to claim 1, wherein the positive control system is formed by a lever transmission.

3. The motor vehicle according to claim 2, wherein the lever transmission comprises a connecting rod pivotally connected to the interior part of the rear hood and which, on one side, interacts with a tilt-out lever and, on the other side, with a toggle lever, the toggle lever being operatively connected with the flap, and the tilt-out lever being operatively connected with the current breakaway element, and two guide levers are arranged between the current breakaway element and the flap approximately in parallelogram-like manner.

4. The motor vehicle according to claim 1, wherein the current breakaway element, in the moved-in, inoperative position, is sunk in a receiving device of the vehicle body.

5. The motor vehicle according to claim 4, wherein the positive control system is formed by a lever transmission.

6. The motor vehicle according to claim 5, wherein viewed in cross-section along a longitudinal direction of the vehicle, the current breakaway element has an upright concave profile which has a circular cross-sectional widened portion on its upper end.

7. The motor vehicle according to claim 6, wherein the flap and the current breakaway element are arranged on one of a lid and a rear hood of the body.

8. The A motor vehicle according to claim 7, wherein the flap is connected via a hinge to an interior part of one of the lid and the rear hood.

9. The motor vehicle according to claim 8, wherein the adjusting device for the flap comprises a tilt-out lever which, on one side, is pivotally connected with an end area of the flap and, on the other side, is pivotally connected with a guiding element displaceably disposed in a guide rail, the guide element being moved in the guide rail by a spindle.

10. The motor vehicle according to claim 9, wherein the lever transmission comprises a connecting rod pivotally connected to the interior part of the rear hood and which, on one side, interacts with a tilt-out lever and, on the other side, with a toggle lever, the toggle lever being operatively connected with the flap, and the tilt-out lever being operatively connected with the current breakaway element, and two guide levers are arranged between the current breakaway element and the flap approximately in parallelogram-like manner.

* * * * *